(12) United States Patent
Marina

(10) Patent No.: US 6,237,897 B1
(45) Date of Patent: May 29, 2001

(54) OXYGENATOR

(76) Inventor: Antonio Marina, C/C Cedeno. Local 79, Valencia (VE)

( * ) Notice: Subject to any disclaimer, the term of this patent is extended or adjusted under 35 U.S.C. 154(b) by 0 days.

(21) Appl. No.: 09/301,757

(22) Filed: Apr. 29, 1999

(51) Int. Cl.$^7$ ................................................. B01F 3/04
(52) U.S. Cl. ....................... 261/64.1; 137/855; 261/76; 261/DIG. 75
(58) Field of Search ..................... 261/76, 123, 64.1, 261/DIG. 75

(56) References Cited

U.S. PATENT DOCUMENTS

| | | | |
|---|---|---|---|
| 1,747,687 | * 2/1930 | Wheeler | 261/DIG. 75 |
| 3,693,656 | * 9/1972 | Sauer | 261/DIG. 75 |
| 4,041,981 | * 8/1977 | Davis et al. | 261/DIG. 75 |
| 4,562,014 | * 12/1985 | Johnson | 261/64.1 |
| 4,743,405 | * 5/1988 | Durao et al. | 261/76 |
| 4,752,401 | * 6/1988 | Bodenstein | 210/746 |
| 4,761,077 | * 8/1988 | Werner | 261/76 X |
| 5,034,110 | * 7/1991 | Gore et al. | 204/228 |
| 5,066,408 | * 11/1991 | Powell | 210/765 |
| 5,172,432 | * 12/1992 | Beland | 4/507 |
| 5,413,142 | * 5/1995 | Johnson et al. | 137/855 X |
| 5,520,856 | * 5/1996 | Garrett et al. | 261/DIG. 75 |
| 5,582,719 | * 12/1996 | Nagano | 210/139 |
| 5,660,802 | * 8/1997 | Archer et al. | 422/261 |

* cited by examiner

Primary Examiner—Richard L. Chiesa

(57) ABSTRACT

A oxygenator for oxygenating water in swimming pools. The oxygenator includes a chamber which has a port outwardly extending therefrom for drawing air into the chamber. A venturi is extended through the chamber. The venturi has opposite inlet and outlet ends, opposite generally frustaconical inlet and outlet portions and an intermediate portion interposed between the inlet and outlet portions of the venturi. The intermediate portion of the venturi has a plurality of spaced apart apertures therethrough to permit passage of air in the chamber into the intermediate portion of the venturi.

2 Claims, 2 Drawing Sheets

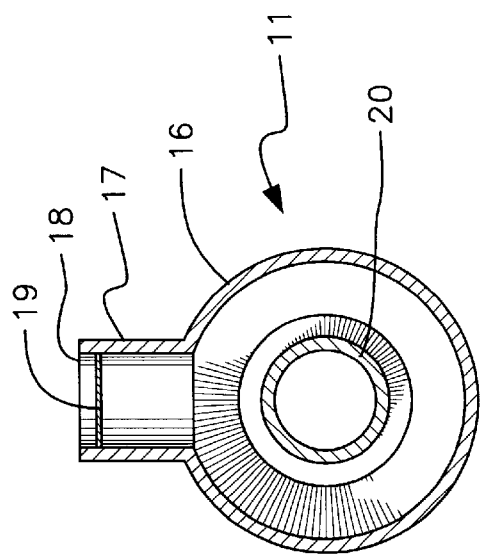
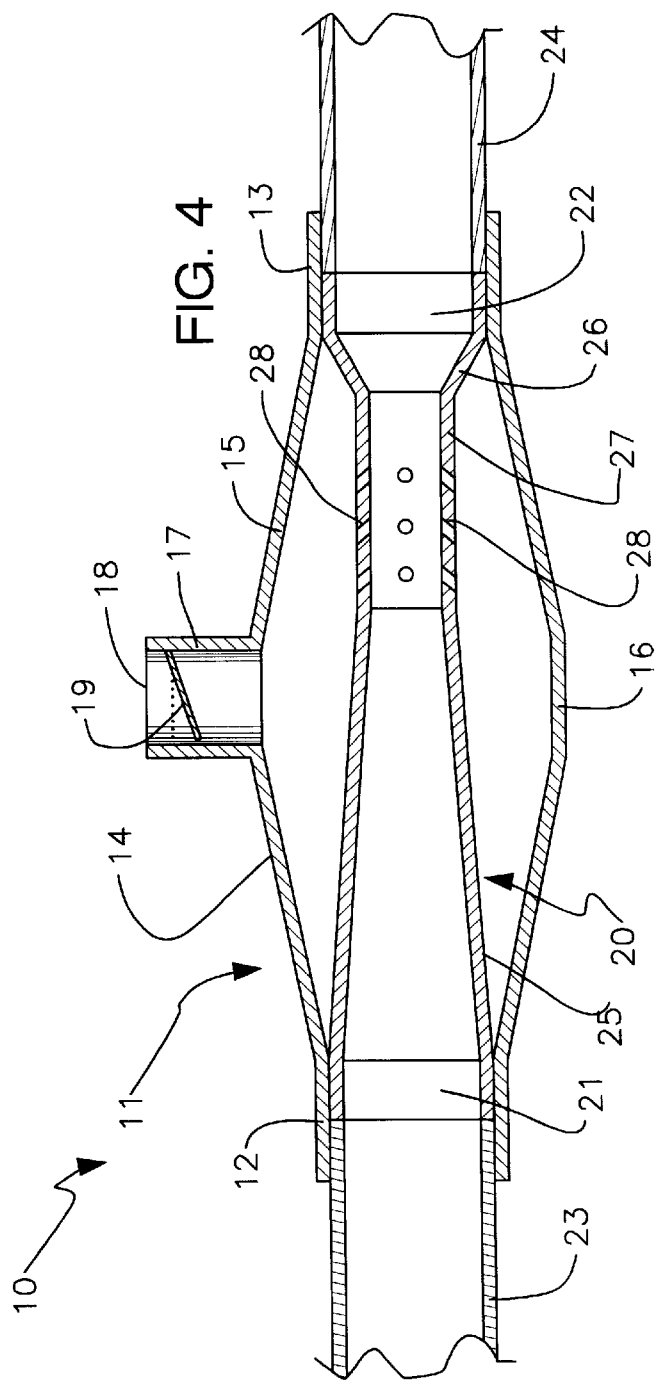

OXYGENATOR

BACKGROUND OF THE INVENTION

1. Field of the Invention

The present invention relates to oxygenators and more particularly pertains to a new oxygenator for oxygenating water in swimming pools.

2. Description of the Prior Art

The use of oxygenators is known in the prior art. More specifically, oxygenators heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,172,432; U.S. Pat. No. 4,752,401; U.S. Pat. No. 5,660,802; U.S. Pat. No. 5,582,719; U.S. Pat. No. 5,066,408; and U.S. Pat. No. 5,034,110.

While these devices fulfill their respective, particular objectives and requirements, the aforementioned patents do not disclose a new oxygenator. The inventive device includes a chamber having a port outwardly extending therefrom for drawing air into the chamber. A venturi is extended through the chamber. The venturi has opposite inlet and outlet ends, opposite generally frusta-conical inlet and outlet portions and an intermediate portion interposed between the inlet and outlet portions of the venturi. The intermediate portion of the venturi has a plurality of spaced apart apertures therethrough to permit passage of air in the chamber into the intermediate portion of the venturi.

In these respects, the oxygenator according to the present invention substantially departs from the conventional concepts and designs of the prior art, and in so doing provides an apparatus primarily developed for the purpose of oxygenating water in swimming pools.

SUMMARY OF THE INVENTION

In view of the foregoing disadvantages inherent in the known types of oxygenators now present in the prior art, the present invention provides a new oxygenator construction wherein the same can be utilized for oxygenating water in swimming pools.

The general purpose of the present invention, which will be described subsequently in greater detail, is to provide a new oxygenator apparatus and method which has many of the advantages of the oxygenators mentioned heretofore and many novel features that result in a new oxygenator which is not anticipated, rendered obvious, suggested, or even implied by any of the prior art oxygenators, either alone or in any combination thereof.

To attain this, the present invention generally comprises a chamber has a port outwardly extending therefrom for drawing air into the chamber. A venturi is extended through the chamber. The venturi has opposite inlet and outlet ends, opposite generally frusta-conical inlet and outlet portions and an intermediate portion interposed between the inlet and outlet portions of the venturi. The intermediate portion of the venturi has a plurality of spaced apart apertures therethrough to permit passage of air in the chamber into the intermediate portion of the venturi.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oxygenator apparatus and method which has many of the advantages of the oxygenators mentioned heretofore and many novel features that result in a new oxygenator which is not anticipated, rendered obvious, suggested, or even implied by any of the prior art oxygenators, either alone or in any combination thereof.

It is another object of the present invention to provide a new oxygenator which may be easily and efficiently manufactured and marketed.

It is a further object of the present invention to provide a new oxygenator which is of a durable and reliable construction.

An even further object of the present invention is to provide a new oxygenator which is susceptible of a low cost of manufacture with regard to both materials and labor, and which accordingly is then susceptible of low prices of sale to the consuming public, thereby making such oxygenator economically available to the buying public.

Still yet another object of the present invention is to provide a new oxygenator which provides in the apparatuses and methods of the prior art some of the advantages thereof, while simultaneously overcoming some of the disadvantages normally associated therewith.

Still another object of the present invention is to provide a new oxygenator for oxygenating water in swimming pools.

Yet another object of the present invention is to provide a new oxygenator which includes a chamber has a port outwardly extending therefrom for drawing air into the chamber. A venturi is extended through the chamber. The venturi has opposite inlet and outlet ends, opposite generally frusta-conical inlet and outlet portions and an intermediate portion interposed between the inlet and outlet portions of the venturi. The intermediate portion of the venturi has a plurality of spaced apart apertures therethrough to permit passage of air in the chamber into the intermediate portion of the venturi.

Still yet another object of the present invention is to provide a new oxygenator that oxygenates pools inexpensively and without energy expenditure.

Even still another object of the present invention is to provide a new oxygenator that may also be used to treat a water supply of residential and industrial applications and that may also be used to mix chemicals into a fluid supply.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross sectional view of the present invention taken from line 3—3 of FIG. 1.

FIG. 4 is a schematic cross sectional view of the present invention taken from line 4—4 of FIG. 1.

DESCRIPTION OF THE PREFERRED EMBODIMENT

Figure 1:
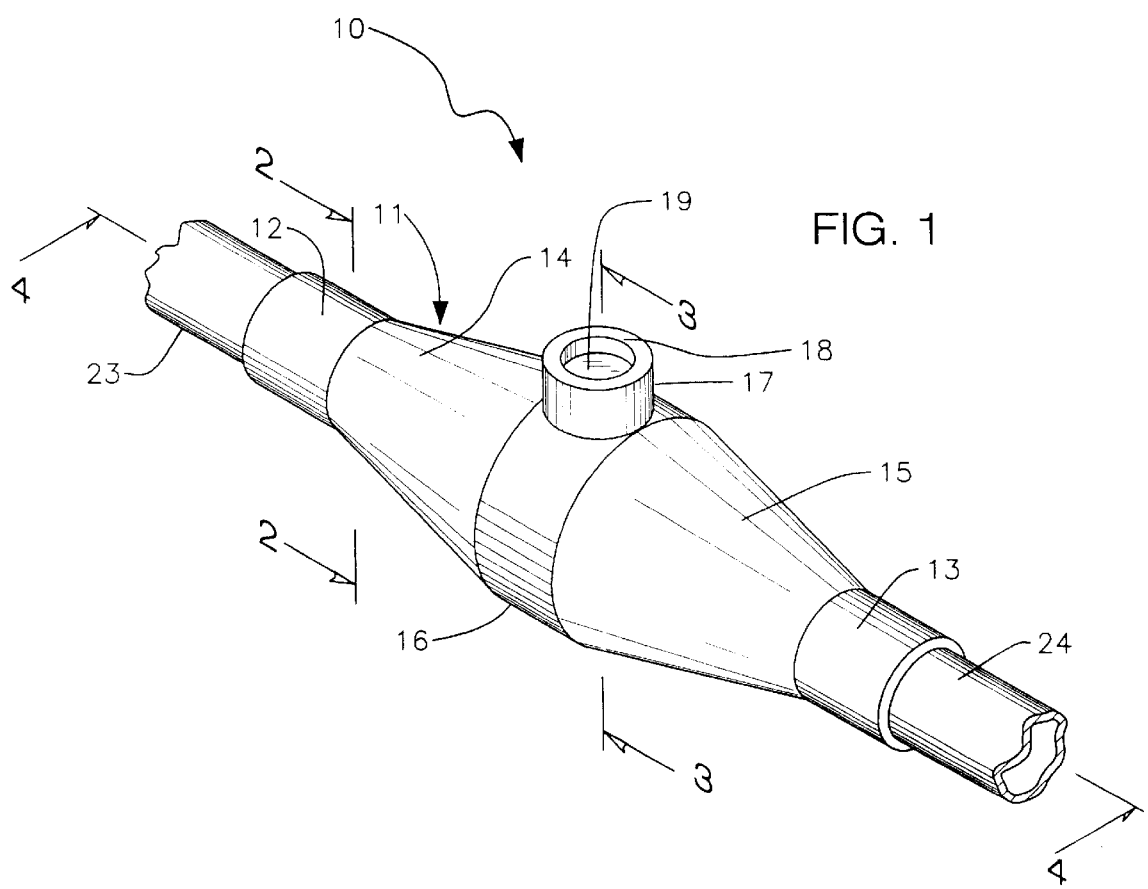
FIG. 1 is a schematic perspective view of a new oxygenator according to the present invention.
Figure 2:
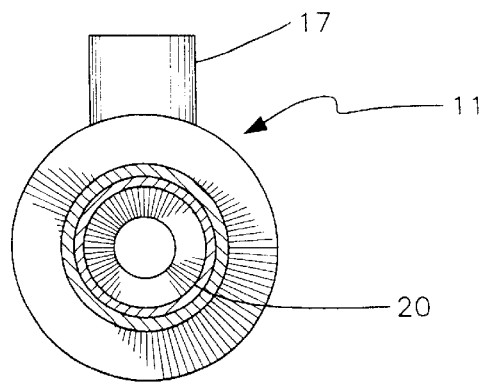
FIG. 2 is a schematic cross sectional view of the present invention taken from line 2—2 of FIG. 1.

With reference now to the drawings, and in particular to FIGS. 1 through 4 thereof, a new oxygenator embodying the principles and concepts of the present invention and generally designated by the reference numeral 10 will be described.

As best illustrated in FIGS. 1 through 4, the oxygenator 10 generally comprises a chamber has a port outwardly extending therefrom for drawing air into the chamber. A venturi is extended through the chamber. The venturi has opposite inlet and outlet ends, opposite generally frusta-conical inlet and outlet portions and an intermediate portion interposed between the inlet and outlet portions of the venturi. The intermediate portion of the venturi has a plurality of spaced apart apertures therethrough to permit passage of air in the chamber into the intermediate portion of the venturi.

In use, the oxygenator 10 is preferably designed for mixing air with a supply of water flowing through the oxygenator although it may also be used to mix a chemical with water as well. In closer detail, the oxygenator comprises a chamber 11 having opposite proximal and distal ends 12,13, and a longitudinal axis extending between the proximal and distal ends of the chamber. The chamber has generally frusta-conical proximal and distal portions 14,15 and a generally cylindrical middle portion 16 interposed between the proximal and distal portions of the chamber. The proximal, distal, and middle portions of the chamber are all coaxial with the longitudinal axis of the chamber. The proximal portion of the chamber is positioned towards and tapers towards the proximal end of the chamber. The distal portion of the chamber is positioned towards and tapers towards the distal end of the chamber.

The middle portion of the chamber has a generally cylindrical port 17 outwardly extending therefrom and in fluid communication with the chamber. The port of the middle portion has a longitudinal axis preferably extending substantially perpendicular to the longitudinal axis of the chamber. The port has a generally circular open free end 18 for providing a passage for air into the chamber through the port. Preferably, a one-way valve 19 is pivotally coupled to the port to selectively closing the open free end of the port. In use, the valve permits passage of air into the chamber via the port and closing passage of air out of the chamber via the port. The valve may comprise a flapper valve that selectively closes the port. The flapper valve permits passage of fluid into the chamber via the port and prevents passage of fluid out of the chamber via the port. The flapper valve comprises a substantially circular disk pivotally mounted in the port for selectively closing the port.

A venturi 20 is extended through the chamber between the proximal and distal ends of the chamber. The venturi has opposite inlet and outlet ends 21,22, and a longitudinal axis extending between the inlet and outlet ends of the venturi. The longitudinal axes of the chamber and venturi are preferably coaxial with one another. The inlet end of the venturi is positioned adjacent the proximal end of the chamber and the outlet end of the venturi is positioned adjacent the distal end of the chamber.

The inlet end of the venturi is in fluid communication with an input conduit 23 outwardly extending from the proximal end of the chamber. The outlet end of the venturi is in fluid communication with an output conduit 24 outwardly extending from the distal end of the chamber. The input conduit is in fluid communication with a water supply such that water from the water supply passes through the input conduit into the venturi and out of the venturi to the output conduit which is in fluid communication with the destination of the oxygenated water.

The venturi has opposite generally frusta-conical inlet and outlet portions 25,26 and a generally cylindrical intermediate portion 27 interposed between the inlet and outlet portions of the venturi. The inlet, outlet, and intermediate portions of the venturi are coaxial with the longitudinal axis of the venturi. Preferably, as best illustrated in FIG. 4, the intermediate portion of the venturi is located in the chamber between a plane defined by the longitudinal axis of the port and a plane defined by the distal end of the chamber.

The inlet portion of the venturi tapers from the inlet end of the venturi to the intermediate portion of the venturi. The outlet portion of the venturi tapers from the intermediate portion of the venturi to the outlet end of the venturi.

The intermediate portion of the venturi has a plurality of spaced apart apertures 28 therethrough to permit passage of air in the chamber into the intermediate portion of the venturi. The apertures each have a longitudinal axis extending at an acute angle to the longitudinal axis of the venturi in a direction towards the inlet end of the venturi as best shown in FIG. 4. Also with reference to FIG. 4, preferably, the plurality of apertures are arranged in at least one pair of diametric rows. Each row of apertures is extended substantially parallel to the longitudinal axis of the venturi. The apertures are preferably spaced apart at equal intervals in the respective row of apertures.

In use, oxygenation occurs in the intermediate portion of the venturi. Air is drawn from the chamber through the apertures due to the increase of the velocity of fluid flowing through the intermediate portion of the venturi. The air then mixes with the fluid passing through the intermediate portion to oxygenate the fluid. In a preferred embodiment, the inner diameter of the intermediate portions gradually increases by two percent from the end of the intermediate portion adjacent the inlet portion of the venturi to the end of the intermediate portion adjacent the outlet portion of the venturi to prevent obstruction to the liquid flow. The diameter of the outlet portion increases from the intermediate portion to the same size of the outlet conduit adjacent the outlet conduit to produce the desired increase in velocity of the liquid flow.

In an ideal illustrative embodiment, where $\Phi$ is the basic unit of diameter, the length of the inlet portion defined along the longitudinal axis of the venturi is $2\Phi$, the length of the intermediate portion defined along the longitudinal axis of the venturi is $\Phi$, and the length of the outlet portion defined along the longitudinal axis of the venturi is $\frac{1}{2}\Phi$. In this ideal illustrative embodiment, the inlet side of the inlet portion preferably has a diameter of $\Phi$ and tapers to a diameter of $0.4\Phi$ at the outlet side of the inlet portion. The inlet side of the intermediate portion preferably has a diameter of $0.4\Phi$ and flares gradually to a 2% larger diameter of $0.408\Phi$ at the outlet side of the intermediate portion. In this ideal illustrative embodiment, the inlet side of the outlet portion preferably has a diameter of $0.408\Phi$ and flares to a diameter of $\Phi$ at the outlet side of the outlet portion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An oxygenator for mixing air with a supply of water flowing through said oxygenator, said oxygenator comprising:

a chamber having a port outwardly extending therefrom for drawing air into said chamber;

a venturi being extended through said chamber;

said venturi having opposite inlet and outlet ends, opposite generally frusta-conical inlet and outlet portions and an intermediate portion interposed between said inlet and outlet portions of said venturi;

said intermediate portion of said venturi having a plurality of spaced apart apertures therethrough to permit passage of air in said chamber into said intermediate portion of said venturi;

wherein a flapper valve selectively closes said port, said flapper valve permitting passage of fluid into said chamber via said port and preventing passage of fluid out of said chamber via said port;

wherein said chamber has opposite proximal and distal ends, and a longitudinal axis extending between said proximal and distal ends of said chamber, said port having a longitudinal axis extending substantially perpendicular to said longitudinal axis of said chamber;

wherein said chamber has generally frusta-conical proximal and distal portions and a generally cylindrical middle portion interposed between said proximal and distal portions of said chamber, said proximal, distal, and middle portions of said chamber being coaxial with said longitudinal axis of said chamber, said port being extended from said middle portion of said chamber;

wherein said flapper valve comprises a substantially circular disk pivotally mounted in said port for selectively closing said port;

wherein said venturi has a longitudinal axis extending between said inlet and outlet ends of said venturi, wherein said apertures each having a longitudinal axis extending at an acute angle to said longitudinal axis of said venturi in a direction towards said inlet end of said venturi;

wherein said plurality of apertures are arranged in at least one pair of diametric rows; and wherein said apertures are spaced apart at equal intervals in the respective row of apertures.

2. An oxygenator for mixing air with a supply of water flowing through said oxygenator, said oxygenator comprising:

a chamber having opposite proximal and distal ends, and a longitudinal axis extending between said proximal and distal ends of said chamber;

said chamber having generally frusta-conical proximal and distal portions and a generally cylindrical middle portion interposed between said proximal and distal portions of said chamber, said proximal, distal, and middle portions of said chamber being coaxial with said longitudinal axis of said chamber;

said proximal portion of said chamber being positioned towards and tapering towards said proximal end of said chamber;

said distal portion of said chamber being positioned towards and tapering towards said distal end of said chamber;

said middle portion of said chamber having a generally cylindrical port outwardly extending therefrom and in fluid communication with said chamber, said port of said middle portion having a longitudinal axis extending substantially perpendicular to said longitudinal axis of said chamber;

said port having a generally circular open free end for providing a passage for air into said chamber through said port;

a valve selectively closing said open free end of said port, said valve permitting passage of air into said chamber via said port and closing passage of air out of said chamber via said port;

a venturi being extended through said chamber between said proximal and distal ends of said chamber;

said venturi having opposite inlet and outlet ends, and a longitudinal axis extending between said inlet and outlet ends of said venturi;

said longitudinal axes of said chamber and venturi being coaxial with one another, said inlet end of said venturi being positioned adjacent said proximal end of said chamber, said outlet end of said venturi being positioned adjacent said distal end of said chamber;

said inlet end of said venturi being in fluid communication with an input conduit outwardly extending from said proximal end of said chamber, said outlet end of said venturi being in fluid communication with an output conduit outwardly extending from said distal end of said chamber;

said venturi having opposite generally frusta-conical inlet and outlet portions and a generally cylindrical intermediate portion interposed between said inlet and outlet portions of said venturi;

said inlet, outlet, and intermediate portions of said venturi being coaxial with said longitudinal axis of said venturi;

said inlet portion of said venturi tapering from said inlet end of said venturi to said intermediate portion of said venturi;

said outlet portion of said venturi tapering from said intermediate portion of said venturi to said outlet end of said venturi;

said intermediate portion of said venturi having a plurality of spaced apart apertures therethrough to permit passage of air in said chamber into said intermediate portion of said venturi;

said apertures each having a longitudinal axis extending at an acute angle to said longitudinal axis of said venturi in a direction towards said inlet end of said venturi;

said plurality of apertures being arranged in at least one pair of diametric rows, each row of apertures being extending substantially parallel to said longitudinal axis of said venturi;

said apertures being spaced apart at equal intervals in the respective row of apertures; and wherein said flapper valve comprises a substantially circular disk pivotally mounted in said port for selectively closing said port.

* * * * *